(12) United States Patent
Yoshimura et al.

(10) Patent No.: US 11,059,743 B2
(45) Date of Patent: Jul. 13, 2021

(54) SUBSTRATE PROVIDED WITH COATING FILM

(71) Applicant: Central Glass Company, Limited, Ube (JP)

(72) Inventors: Ryota Yoshimura, Matsusaka (JP); Takeyuki Kaneda, Matsusaka (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 15/741,033

(22) PCT Filed: Jun. 13, 2016

(86) PCT No.: PCT/JP2016/067488
§ 371 (c)(1),
(2) Date: May 30, 2018

(87) PCT Pub. No.: WO2017/002592
PCT Pub. Date: Jan. 5, 2017

(65) Prior Publication Data
US 2018/0305248 A1    Oct. 25, 2018

(30) Foreign Application Priority Data

Jun. 30, 2015  (JP) .............................. JP2015-130968
Dec. 29, 2015  (JP) .............................. JP2015-257578

(51) Int. Cl.
*B32B 17/06*    (2006.01)
*B32B 3/02*     (2006.01)
(Continued)

(52) U.S. Cl.
CPC .............. *C03C 17/326* (2013.01); *B05D 1/26* (2013.01); *B05D 1/36* (2013.01); *B60J 1/00* (2013.01);
(Continued)

(58) Field of Classification Search
CPC ..... Y10T 428/24488; Y10T 428/24479; Y10T 428/24777; Y10T 428/24612;
(Continued)

(56) References Cited

U.S. PATENT DOCUMENTS 5,500,274 A * 3/1996 Francis ................. B05D 1/265
428/156
5,556,667 A * 9/1996 Teranishi ................ B05D 1/32
427/163.1
(Continued)

FOREIGN PATENT DOCUMENTS

JP      3-193160 A    8/1991
JP      2-291666 A    11/1995
(Continued)

OTHER PUBLICATIONS

International Search Report (PCT/ISA/210) issued in PCT Application No. PCT/JP2016/067488 dated Sep. 13, 2016 with English-language translation (five (5) pages).
(Continued)

*Primary Examiner* — Joanna Pleszczynska
(74) *Attorney, Agent, or Firm* — Crowell & Moring LLP

(57) ABSTRACT

Disclosed is a process for producing a film-coated substrate having a relatively flat distribution of film thickness such that the film thickness is suppressed from gradually increasing toward a downstream side of flow of a coating liquid even when a coating film is formed on a plate-shaped substrate by a flow coating method in which the substrate is held in raised attitude. The film-coated substrate according to the present invention is employed in particular as an openable/closable window glass of an automotive door, and is suitable for one where the substrate includes an uncoated region where no coating film is formed, wherein the
(Continued)

uncoated region is configured to be received in a receiving part of an upper frame of the door.

16 Claims, 11 Drawing Sheets

(51) Int. Cl.
| | |
|---|---|
| *B32B 3/26* | (2006.01) |
| *B60J 1/00* | (2006.01) |
| *B60J 1/17* | (2006.01) |
| *B05D 1/26* | (2006.01) |
| *B05D 1/32* | (2006.01) |
| *C03C 17/32* | (2006.01) |
| *C03C 17/00* | (2006.01) |
| *B05D 1/36* | (2006.01) |

(52) U.S. Cl.
CPC ........ *C03C 17/002* (2013.01); *B05D 2203/35* (2013.01); *B05D 2401/10* (2013.01); *C03C 2217/475* (2013.01); *C03C 2217/74* (2013.01); *C03C 2218/112* (2013.01); *C03C 2218/114* (2013.01)

(58) Field of Classification Search
CPC ..... Y10T 428/24802; B60J 1/00; B60J 3/007; C03C 2217/74; B05D 1/32; B32B 17/06; B32B 3/02; B32B 3/263; B32B 2605/006; B32B 2307/71
See application file for complete search history.

(56) References Cited

U.S. PATENT DOCUMENTS

| | | |
|---|---|---|
| 5,693,365 A | 12/1997 | Teranishi et al. |
| 8,367,187 B2 | 2/2013 | Muromachi et al. |
| 2008/0178531 A1* | 7/2008 | Takeuchi ................. B60J 1/17 49/475.1 |
| 2009/0080066 A1 | 3/2009 | Muromachi et al. |

FOREIGN PATENT DOCUMENTS

| | | |
|---|---|---|
| JP | 7-291666 A | 11/1995 |
| JP | 8-179101 A | 7/1996 |
| JP | 2001-118501 A | 4/2001 |
| JP | 2004-39828 A | 2/2004 |
| JP | 2007-176443 A | 7/2007 |
| JP | 2007-191322 A | 8/2007 |
| JP | 2011-256060 A | 12/2011 |
| JP | 2013-129576 A | 7/2013 |
| JP | 2014-111453 | 6/2014 |
| JP | 2014-200730 A | 10/2014 |

OTHER PUBLICATIONS

Japanese-language Written Opinion (PCT/ISA/237) issued in PCT/JP2016/067488 dated Sep. 13, 2016 (Four (4) pages).
English translation of document C2 (Japanese-language Written Opinion (PCT/ISA/237)) issued in PCT/JP2016/067488 dated Sep. 13, 2016 previously filed on Dec. 29, 2017 (five (5) pages).
Extended European Search Report issued in counterpart European Application No. 16817701.2 dated Apr. 24, 2019 (eight (8) pages).

* cited by examiner

SUBSTRATE PROVIDED WITH COATING FILM

TECHNICAL FIELD

The present invention relates to a film-coated substrate, particularly, a film-coated substrate suitable for application as a window glass of an automobile, and a process for producing the same.

BACKGROUND OF INVENTION

A substrate, such as a glass plate, particularly, an automotive window glass, is provided with a coating film on its surface, to serve for ultraviolet shielding, infrared shielding, water repellency, and/or anti-fogging. Such a coating film is formed by a process in which a coating liquid is applied to a plate-shaped substrate by a flow coating method, and is then dried, wherein the flow coating method is to cause the coating liquid to flow out of a nozzle to an upper side of the substrate held in raised attitude (see patent documents 1 to 4, for example).

PRIOR ART DOCUMENT(S)

Patent Document(s)

Patent Document 1: Japanese Patent Application Publication No. H07-291666
Patent Document 2: Japanese Patent Application Publication No. 2007-191322
Patent Document 3: Japanese Patent Application Publication No. 2007-176443
Patent Document 4: Japanese Patent Application Publication No. 2011-256060

SUMMARY OF INVENTION

The flow coating method is a process for producing a film-coated substrate by an operation of discharging a coating liquid from a main nozzle onto at least one main surface of a plate-shaped substrate as a target of coating, for formation of a coating film, while holding the substrate in raised attitude, namely, in inclined or vertical attitude, and causing the main nozzle to travel transversely, namely, horizontally or substantially horizontally, with respect to the substrate, at an upper side portion of the main surface of the substrate. With this process, the coating liquid flows from the upper side portion to a lower side portion of the substrate, so that film thickness of the coating film tends to have a distribution such that the film thickness gradually increases from the upper side portion toward the lower side portion.

With the flow coating method where the substrate is held in raised attitude, it is difficult to prevent the film thickness from gradually increasing toward a downstream side of flow of the coating liquid, which is a requirement for film design. For an ultraviolet shielding film based on ultraviolet absorption, an infrared shielding film based on infrared absorption, an antifog film based on water absorption, etc., their functioning is significantly influenced by film thickness. For these coating films, it has been required to take a countermeasure, for example, by forming a coated section having a greater film thickness than required, so as to prevent any coated section from being functionally insufficient.

It is an object of the present invention to provide a coating process capable of suppressing film thickness of a coating film from gradually increasing toward a downstream side of flow of a coating liquid even with formation of the coating film on a plate-shaped substrate based on a flow coating method in which the substrate is held in raised attitude, and further provide a film-coated substrate suitable for application as a window glass of an automobile.

According to the present invention, a film-coated substrate production process comprises: an operation of discharging a coating liquid (henceforth referred to also as "main coating liquid") from a main nozzle onto at least one main surface of a substrate as a target of coating, while holding the substrate in inclined or vertical attitude and causing the main nozzle to travel at an upper side portion of the main surface of the substrate substantially horizontally with respect to the substrate, wherein the main nozzle is configured to discharge the coating liquid for formation of a coating film; and an operation of discharging a solvent (henceforth referred to also as "auxiliary coating liquid") from an auxiliary nozzle onto the main surface of the substrate while causing the auxiliary nozzle to travel substantially horizontally with respect to the substrate, before discharging the coating liquid onto the main surface of the substrate, wherein the auxiliary nozzle is configured to discharge the solvent for dilution of the main coating liquid; wherein the operation of discharging the coating liquid from the main nozzle onto the main surface of the substrate is performed when the solvent is held in liquid film form on the main surface.

The film-coated substrate production process according to the present invention generally includes: coating the auxiliary coating liquid on the substrate by the flow coating method, to form the liquid film of the auxiliary coating liquid (henceforth referred to also as "base liquid film"); and coating the main coating liquid on the base liquid film by the flow coating method, to form the coating film. The base liquid film also has a film thickness that gradually increases from the upper side portion, where coating is started, toward a lower side portion. The base liquid film dilutes the main coating liquid, which is coated on the base liquid film. Accordingly, after the main coating liquid is coated, the coating liquid on the substrate has a solid content concentration that gradually decreases from the upper side portion, where coating is started, toward the lower side portion.

As a result, formed after drying and solidifying the coating liquid coated on the substrate, the coating film has a film thickness that does not gradually increase from the upper side portion toward the lower side portion, but has a relatively flat distribution. Furthermore, it is possible to arbitrarily set an uncoated region of the film-coated substrate by adjusting a place of discharge of the main nozzle, and it is also possible to arbitrarily provide the coating film with a film thickness gradually varying part (a region in which film thickness gradually increases from the upper side portion, where coating is started, toward the lower side portion) and a part that is relatively flat in distribution of film thickness, by adjusting a place of discharge of the auxiliary nozzle. Moreover, the main coating liquid coated on the base liquid film spreads only within a region where the base liquid film is formed, so that the region where the base liquid film is formed on the substrate can be regarded as a coating region of the main coating liquid. For example, if the base liquid film does not include a part formed in a lateral side portion of the main surface of the substrate, the region of the lateral side portion of the main surface where the base liquid film is not formed can be regarded as an uncoated region in which no coating film is formed.

According to the present invention, a film-coated substrate can be produced by the process described above for application as a window glass of a door of an automobile, wherein the window glass is configured to be opened and closed, the film-coated substrate comprising: a substrate including an uncoated region where no coating film is formed, wherein the uncoated region is configured to be received in a receiving part of an upper frame of the door; and a coating film formed by an operation of discharging the coating liquid from the nozzle onto the main surface of the substrate while causing the nozzle to travel with respect to the substrate, wherein the nozzle is configured to discharge the coating liquid for formation of the coating film; wherein the coating film includes a film thickness gradually varying part at an upper edge side periphery of the coating film, wherein the film thickness gradually varying part has a film thickness that decreases gradually toward the uncoated region, wherein the film thickness gradually varying part extends from a line within a range of 5 to 200 mm vertically from the upper edge side periphery of the coating film, wherein the line is substantially parallel to the upper edge side periphery of the coating film, and wherein the film thickness gradually varying part of the coating film has an angle of 0.0005° to 0.02° with respect to the main surface of the substrate. The coating film is required to have a specific film thickness in its nearly entire region, for functioning as intended. It is preferable that a part of the coating film close to the uncoated region has a distribution of film thickness with which optical distortion can be suppressed. Specifically, it is preferable that the coating film includes a film thickness gradually varying part at the upper edge side periphery, wherein the film thickness gradually varying part has a film thickness that gradually decreases toward the uncoated region.

The film thickness gradually varying part extends from a line preferably within a range of 5 to 150 mm, more preferably within a range of 5 to 50 mm, vertically from the upper edge side periphery of the coating film, wherein the line is substantially parallel to the upper edge side periphery of the coating film. With a value greater than 200 mm, it tends to narrow a region where the functioning of the film is effective.

Furthermore, the angle between the main surface of the substrate and the coating film of the film thickness gradually varying part is preferably in a range of 0.0005° to 0.02°, more preferably in a range of 0.0015° to 0.015°. If it is less than 0.0005°, its performance is likely to be degraded because of small film thickness. If it is greater than 0.02°, it is likely that a step occurs at a border between the film and a glass surface, and a film distortion occurs, because of large film thickness.

Effects of Invention

The film-coated substrate production process according to the present invention serves to suppress film thickness of a coating film from gradually increasing toward a downstream side of flow of a coating liquid even with formation of the coating film on a plate-shaped substrate based on a flow coating method in which the substrate is held in raised attitude, and thereby produce a film-coated substrate having a relatively flat distribution of film thickness. The film-coated substrate according to the present invention is suitable for application as a window glass of an automobile, and particularly for one including a substrate including an uncoated region where no coating film is formed, wherein the uncoated region is configured to be received in a receiving part of an upper frame of the door.

DETAILED DESCRIPTION

Figure 1:
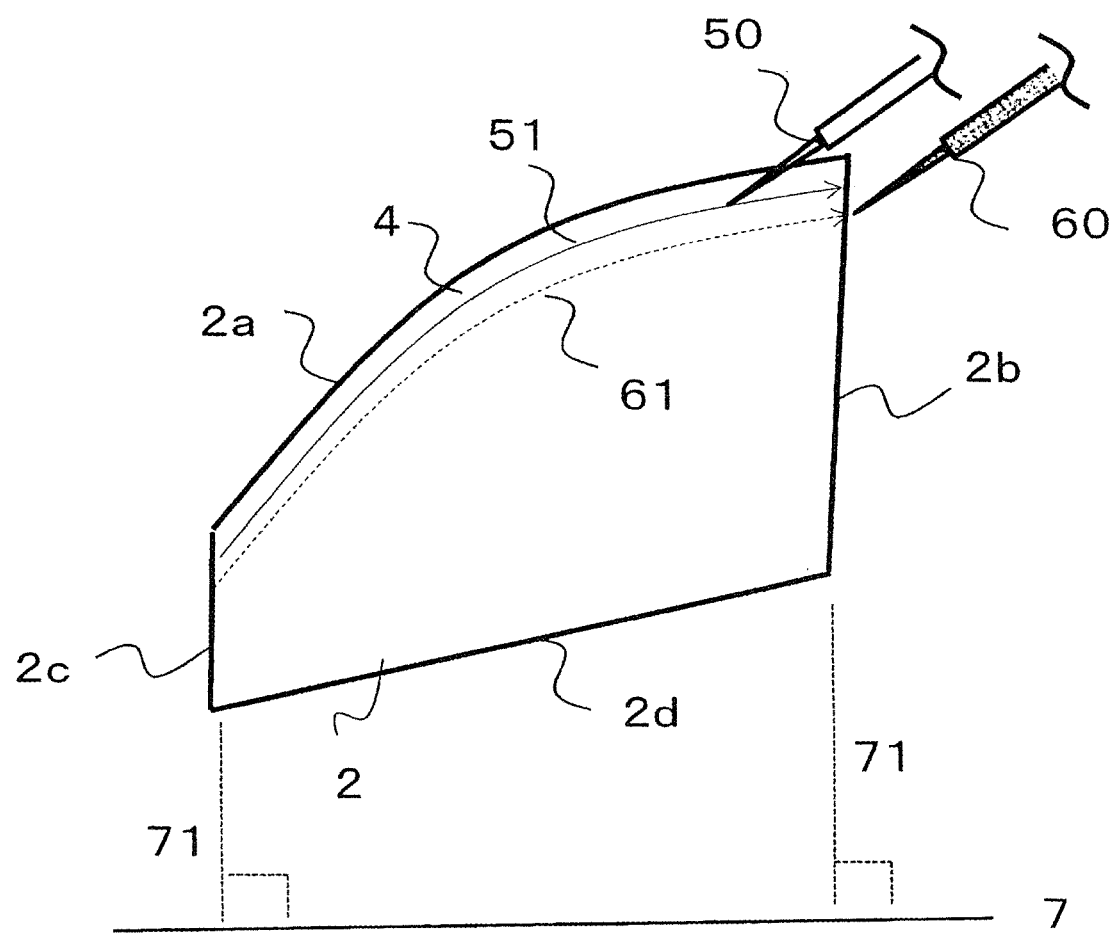
FIG. 1 schematically shows a situation where a main nozzle 50 discharges a main coating liquid and an auxiliary nozzle 60 discharges an auxiliary coating liquid, while the main nozzle 50 and the auxiliary nozzle 60 are caused to travel horizontally with respect to a substrate 2.

The following describes a specific embodiment of the present invention in detail.

1. Examples of Materials Used in Process for Producing Film-Coated Substrate

<Examples of Substrate>

A plate-shaped substrate used in a process for producing a film-coated substrate according to the present invention may be implemented by a glass substrate of inorganic and transparent plate glass, such as soda-lime silicate glass produced by a float process or a roll-out forming process, which are used for windows and mirrors for automobiles and for construction, or soda-lime silicate glass or alkali-free glass used for cover glasses and substrate glasses for display devices. The plate glass may be implemented by colorless glass or colored glass.

The plate-shaped substrate is not particularly limited in shape, but may be implemented by a flat plate or a curved plate. In case of a curved substrate, a coating film may be formed on an outwardly curved surface of the substrate. However, when the curbed substrate is used as an automotive window glass, it is preferable that the coating film is formed on an inwardly curved surface of the substrate, because the inwardly curved surface is an interior surface. Furthermore, the substrate may be formed of tempered glass such as thermally tempered glass or chemically tempered glass, or wired glass. Moreover, the substrate may be implemented by a substrate made of glass such as borosilicate glass, low expansion glass, zero expansion glass, low expansion crystallized glass, zero expansion crystallized glass, glass for TFT, glass for PDP, or substrate glass for optical filter.

Furthermore, the substrate may be implemented by a material other than grass plate substrates, specifically, a plate substrate made of resin such as polyethylene terephthalate resin, polycarbonate resin, polycarbonate resin, polyvinyl chloride resin, or polyethylene resin.

<Examples of Coating Liquid>

A main coating liquid is applied to the substrate, and thereafter dried and solidified, to form a coating film. The main coating liquid is not limited, only if it contains a solvent and a solid content or curable compound forming a coating film.

The main coating liquid is implemented, for example, by a coating liquid containing an oligomer obtained by subjecting an alkoxide compound, which is generally used in film formation for automobiles, to hydrolysis and polycondensation reaction, or by a coating liquid for forming a coating film containing silicon oxide, such as polysilazane, as a main component. Furthermore, the main coating liquid may be implemented by a coating liquid for forming a coating film of epoxy, urethane, etc.

<Auxiliary Coating Liquid>

An auxiliary coating liquid is used to dilute the main coating liquid. The auxiliary coating liquid is selected depending on the kind of the main coating liquid, as a solvent capable of diluting the main coating liquid without solidification and phase separation, and having a high wettability with respect to the substrate, specifically, having a contact angle of 30° or less preferably. The contact angle can be calculated by a method based on a sessile drop method of JIS R 3257 (1999).

The closer the solvent of the main coating liquid is to the auxiliary coating liquid in solubility parameter (SP value), the more desirable it is. Specifically, a difference in SP value between the solvent of the main coating liquid and the auxiliary coating liquid is less than 1.5 $(cal/cm^3)^{1/2}$. If the difference in SP value between the main coating liquid and the auxiliary coating liquid is 1.5 $(cal/cm^3)^{1/2}$ or more, the solid content in the main coating liquid is unable to be dissolved, so that precipitation or phase separation occurs. Accordingly, the difference is preferably 1.0 $(cal/cm^3)^{1/2}$ or less, and more preferably 0.5 $(cal/cm^3)^{1/2}$ or less.

The SP value is a generally known solubility parameter indicative of solubility and compatibility. The SP value can be calculated by known methods which include: a method to calculate the SP value based on heat of vaporization of liquid; and the Hansen method, the Hoy method, the Small method, and the Fedor's estimation method to calculate the SP value based on molecular structure. In the present invention, the Fedor's estimation method is used for calculation based on molecular structure, which is described in R. F. Fedors: Polym. Eng. Sci., 14 (2), 147-154 (1974), for example. In the present invention, the SP value is determined as a value under a measurement condition of 25° C.

It is preferable that the auxiliary coating liquid has a high wettability with respect to the substrate. With regard to the wettability with respect to the substrate, it is preferable that the contact angle with respect to the substrate is 30° or less. It is more preferable that the contact angle is 20° or less. If the contact angle is large, the liquid film of the auxiliary coating liquid tends to split, which requires a large amount of the coating liquid less preferably.

The auxiliary coating liquid is selected depending on the kind of the main coating liquid. For example, if the main coating liquid is implemented by polysilazane (NP110 manufactured by Merck Performance Materials Ltd.), the solvent of the main coating liquid is xylene (SP value: 9.1 $(cal/cm^3)^{1/2}$). Accordingly, it is preferable that the auxiliary coating liquid is implemented by xylene having the same SP value (SP value: 9.1 $(cal/cm^3)^{1/2}$), n-hexane (SP value: 7.2 $(cal/cm^3)^{1/2}$), cyclohexanone (SP value: 9.8 $(cal/cm^3)^{1/2}$), 2-heptane (SP value: 8.5 $(cal/cm^3)^{1/2}$), etc.

2. Formation of Coating Film

<Main Nozzle and Auxiliary Nozzle>

A main nozzle and an auxiliary nozzle may be implemented by any kind of nozzle, only if the kind of nozzle is capable of discharging the main coating liquid or the auxiliary coating liquid. The nozzle may be a singular nozzle, a combined nozzle where a plurality of nozzles are arranged in parallel, a slit nozzle having a wide slit-shaped discharge opening, etc. Nozzle diameters of the main nozzle and the auxiliary nozzle are preferably 0.5 mmφ to 5 mmφ, and more preferably 1 mmφ to 2 mmφ. For coating of the auxiliary coating liquid, it is preferable that the nozzle diameter of the auxiliary nozzle is larger than that of the main nozzle, in order to prevent the auxiliary coating liquid from splitting.

<Operation of Nozzles and Application of Coating Liquids to Substrate>

The following describes application of the main coating liquid and the auxiliary coating liquid to the substrate by the main nozzle and the auxiliary nozzle, with reference to the drawings. FIG. 1 schematically shows a situation where a main nozzle 50 and an auxiliary nozzle 60 discharge the main coating liquid and the auxiliary coating liquid while the main nozzle 50 and the auxiliary nozzle 60 are caused to travel horizontally with respect to a substrate 2, along a trajectory substantially parallel to an inclined upper side 2a of a main surface of the substrate 2, wherein the substrate 2 is used as an automotive window glass, and includes the upper side 2a, a lateral side 2b, a lateral side 2c, and a lower side 2d. FIG. 1 shows a situation where the main nozzle 50 and the auxiliary nozzle 60 below the main nozzle 50 are caused to travel transversely with respect to the substrate 2 while the substrate 2 is held stationary vertically. The action of causing the main nozzle 50 and the auxiliary nozzle 60 to travel with respect to the substrate 2 is implemented by causing the same with respect to the substrate 2 along a trajectory substantially parallel to a side facing the nozzle (upper side 2a, in the situation of FIG. 1) and with a spacing from the facing side. This action forms an uncoated region in which no coating film is formed.

If the substrate 2 has a rectangular shape, namely, a square shape or oblong rectangular shape, the substrate 2 is held vertically with one side placed at the upper side, and the main nozzle 50 and the auxiliary nozzle 60 are caused to travel horizontally or substantially horizontally with respect to the edge at the upper edge side. This feature is effective when the film-coated substrate is used as a substrate for a display device or a building material.

Figure 2:
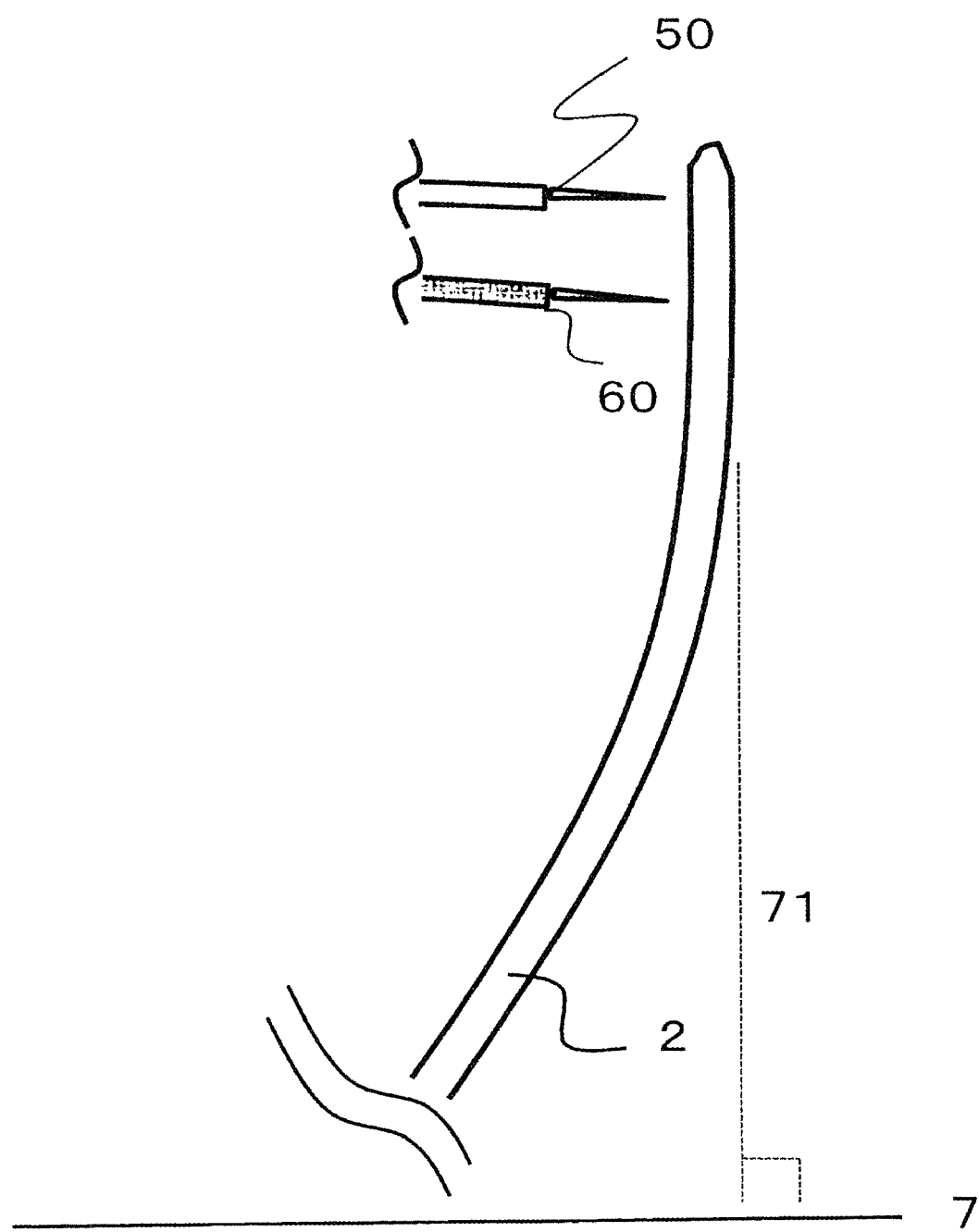
FIG. 2 is a view of the substrate 2 from a part of a lateral side 2b of the substrate 2, schematically showing where the main nozzle 50 and the auxiliary nozzle 60 are set when the main nozzle 50 and the auxiliary nozzle 60 are caused to travel with respect to the substrate 2.
Figure 3:
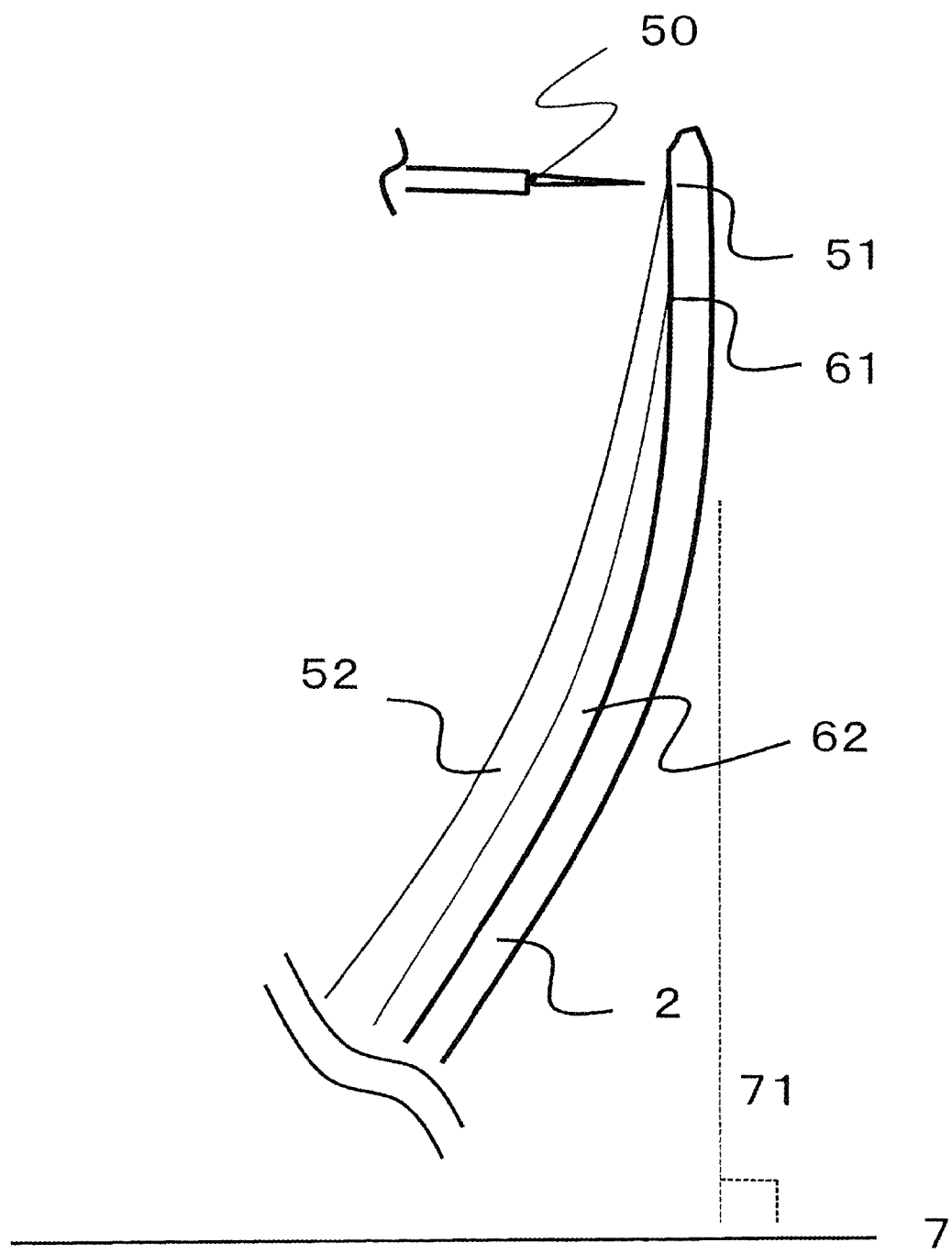
FIG. 3 is a view of the substrate 2 from the part of lateral side 2b, schematically showing a situation where a liquid film 52 of the main coating liquid is formed on a base liquid film 62.

FIG. 2 is a view of the substrate 2 from a part of the lateral side 2b, schematically showing where the main nozzle 50 and the auxiliary nozzle 60 are set when the main nozzle 50 and the auxiliary nozzle 60 are caused to travel with respect to the substrate 2. FIG. 3 is a view of the substrate 2 from the part of lateral side 2b, schematically showing a situation where a liquid film 52 of the main coating liquid is formed on a base liquid film 62.

As shown in FIGS. 1 to 3, at an upper portion of surface of the plate-shaped substrate 2 held in raised attitude (a region at the upper side 2a portion of the main surface of the substrate 2), the auxiliary nozzle 60 discharges the auxiliary coating liquid, while the auxiliary nozzle 60 is caused to travel with respect to the substrate 2, namely, while the auxiliary nozzle 60 is caused to travel transversely with respect to the substrate 2, along an uppermost edge 61 of the base liquid film 62 (a lowermost edge 61 of a film thickness gradually varying part). The auxiliary coating liquid flows on the main surface of glass toward the lower side 2d portion of the substrate 2 by gravity. This forms a base liquid film whose film thickness increases toward its lower part. The uppermost edge 61 (indicated by a broken line in FIG. 1) of the base liquid film 62 is a place from which a part of the coating film extends, the part having a relatively flat distribution of film thickness. In view of appearance of the coating film, it is preferable that the uppermost edge 61 is set substantially parallel to the upper side 2a of the substrate 2.

With the base liquid film 62 held on the substrate 2, the main nozzle 50 discharges the main coating liquid, while the main nozzle 50 is caused to travel with respect to the substrate 2, namely, while the main nozzle 50 is caused to travel transversely with respect to the substrate 2, along an uppermost edge 51 (indicated by a solid line in FIG. 1) of the film thickness gradually varying part. If the main nozzle 50 is caused to discharge the main coating liquid outside of a region where the auxiliary coating liquid is coated, for example, if the main nozzle 50 is caused to relatively travel in a region where the base liquid film 62 is not formed (a region between the lowermost edge 61 and the upper side 2a), the line of the uppermost edge of the coating film (corresponding to the uppermost edge 51 of the film thickness gradually varying part in FIG. 1) has a smooth linear shape (also called parting shape), enhancing the appearance of the film-coated substrate.

The main coating liquid flows on the main surface of glass toward the lower side 2d portion of the substrate 2 by gravity. This forms the liquid film 52 whose film thickness increases toward its lower part. The liquid film 52 of the main coating liquid blends with the base liquid film 62, so that the solid content in the coating liquid, which forms the coating film, has a concentration that decreases toward its lower part. As a result, the film thickness distribution of the film between the uppermost edge 51 and the lowermost edge 61 of the film thickness gradually varying part (referred to as "first film thickness distribution") differs from the film thickness distribution of the film formed from the lowermost edge 61 of the film thickness gradually varying part to the lower side 2d portion of the substrate (referred to as "second film thickness distribution"). As shown in FIG. 1, an uncoated region 4, in which no coating film is formed, is formed between the upper side 2a of the substrate and the uppermost edge 51 of the film thickness gradually varying part.

Figure 6:
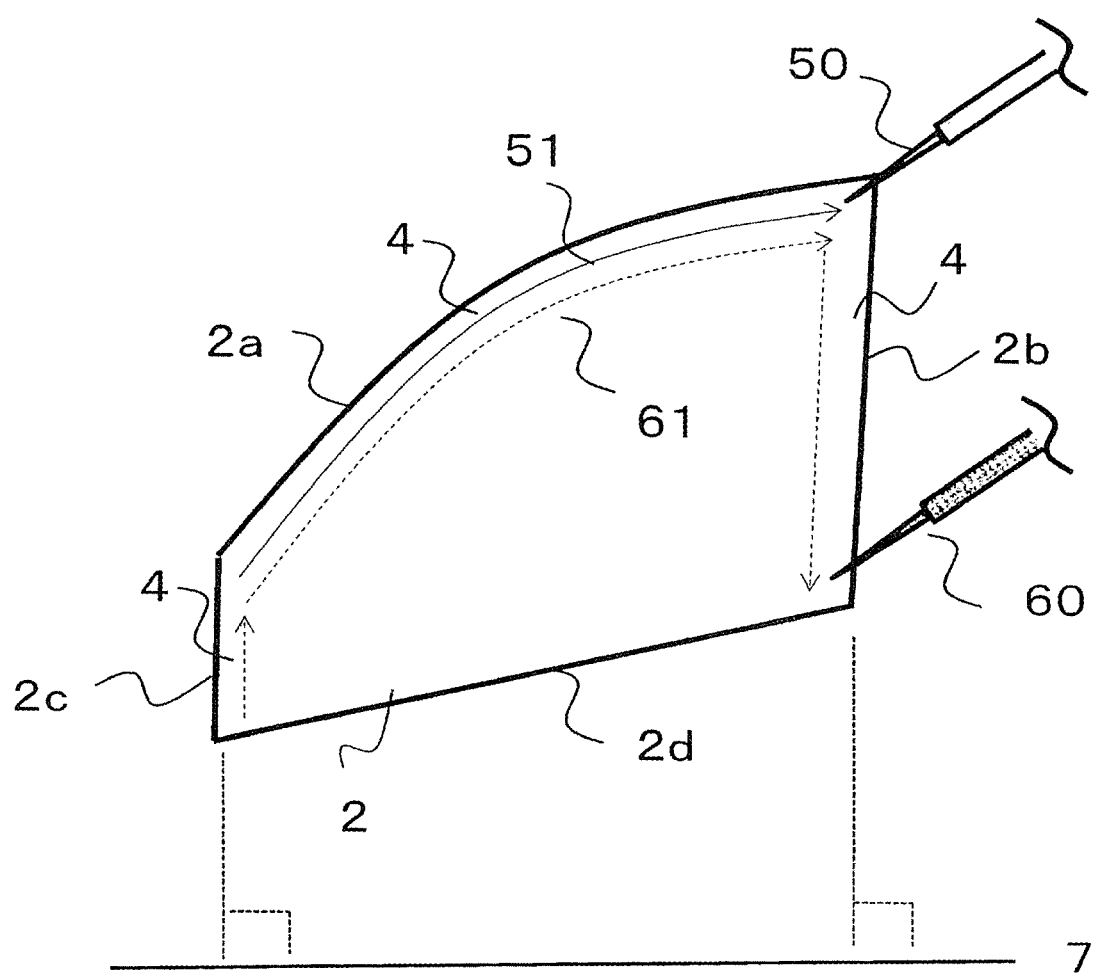
FIG. 6 schematically shows a situation where the main nozzle 50 discharges the main coating liquid and the auxiliary nozzle 60 discharges the auxiliary coating liquid, while the main nozzle 50 and the auxiliary nozzle 60 are caused to travel with respect to the substrate 2, wherein an uncoated region, in which no coating film is formed, is formed at lateral side portions of the main surface of the substrate 2.
Figure 7:
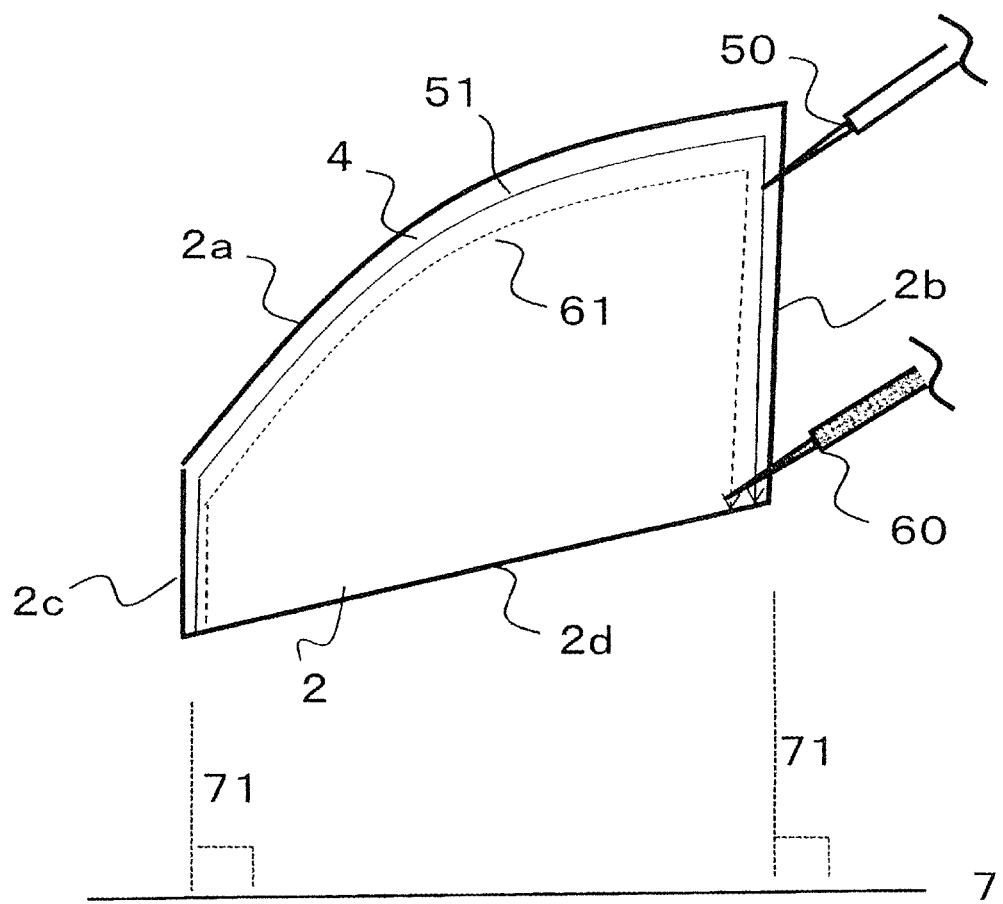
FIG. 7 schematically shows an example of situation other than FIG. 6, where the main nozzle 50 discharges the main coating liquid and the auxiliary nozzle 60 discharges the auxiliary coating liquid, while the main nozzle 50 and the auxiliary nozzle 60 are caused to travel horizontally with respect to the substrate 2.
Figure 8:
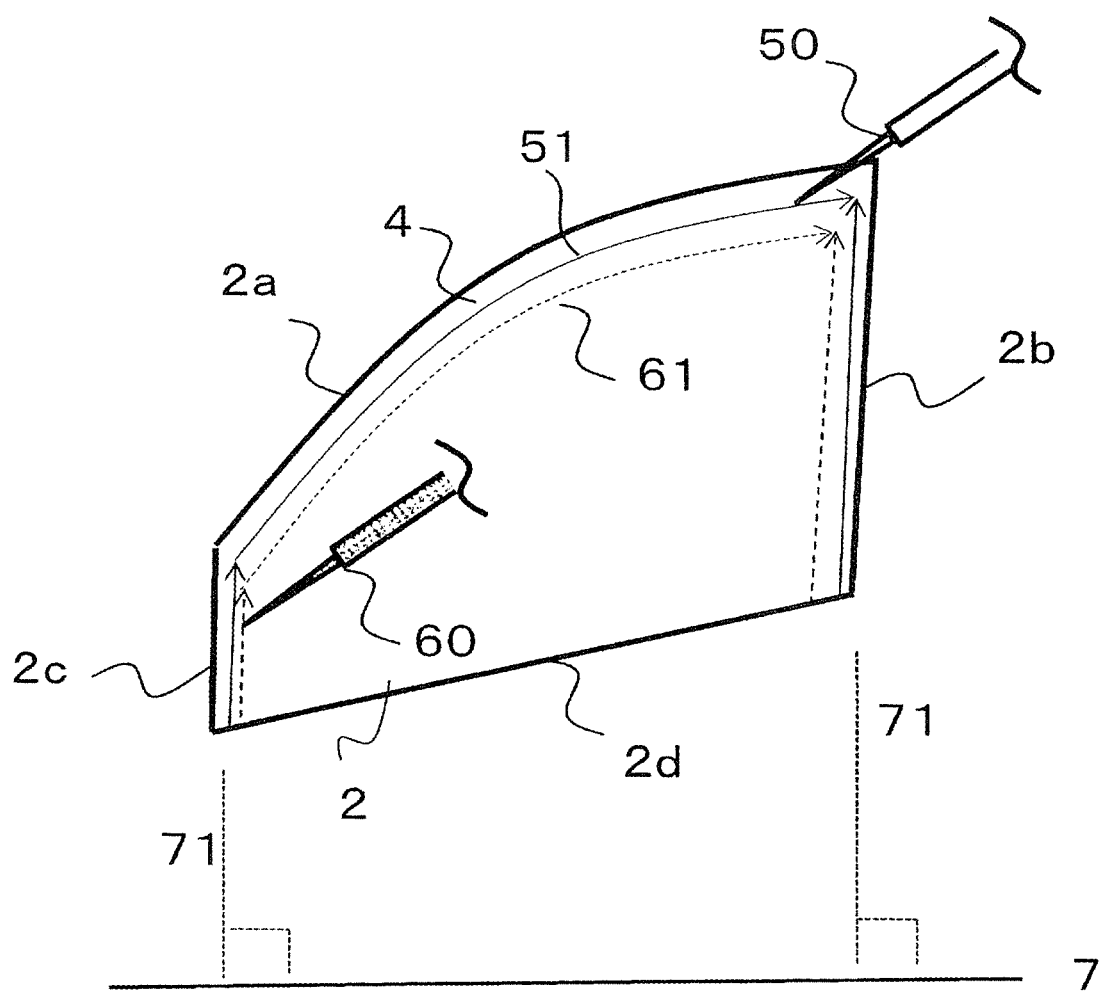
FIG. 8 schematically shows an example of situation other than FIG. 6, where the main nozzle 50 discharges the main coating liquid and the auxiliary nozzle 60 discharges the auxiliary coating liquid, while the main nozzle 50 and the auxiliary nozzle 60 are caused to travel horizontally with respect to the substrate 2.

The movement of each nozzle with respect to the substrate 2 and the discharge of each coating liquid may be performed only for the upper side 2a portion of the substrate. As shown in FIGS. 6 to 8, the process may further include an operation of causing at least one of the main nozzle 50 and the auxiliary nozzle 60 to travel vertically with respect to the substrate 2. These relative movements are indicated by broken and solid arrows in FIGS. 6 to 8.

FIG. 6 schematically shows an example of situation where the main nozzle 50 discharges the main coating liquid and the auxiliary nozzle 60 discharges the auxiliary coating liquid, while the main nozzle 50 and the auxiliary nozzle 60 are caused to travel with respect to the substrate 2, wherein uncoated regions, in which no coating film is formed, are formed at lateral side portions of the main surface of the substrate 2. The auxiliary nozzle 60 discharges the auxiliary coating liquid, while the auxiliary nozzle 60 is caused to travel with respect to the substrate 2, along the lateral side 2c from the lower side of the substrate 2, with an arbitrary spacing to the lateral side 2c. Thereafter, the auxiliary nozzle 60 discharges the auxiliary coating liquid, while the auxiliary nozzle 60 is caused to travel with respect to the substrate 2, along the upper side 2a of the substrate 2, with an arbitrary spacing to the upper side 2a. Furthermore, the auxiliary nozzle 60 discharges the auxiliary coating liquid, while the auxiliary nozzle 60 is caused to travel with respect to the substrate 2, along the lateral side 2b from the upper side of the substrate 2, with an arbitrary spacing to the lateral side 2b, forming the base liquid film. After formation of the base liquid film, the main nozzle 50 discharges the main coating liquid, while the main nozzle 50 is caused to travel with respect to the substrate 2, along the upper side 2a of the substrate 2, with an arbitrary spacing to the upper side 2a. This process of coating forms the uncoated regions 4 at the lateral side 2b portion and the lateral side 2c portion, respectively.

The operation of forming uncoated regions, in which no coating film is formed, at lateral side portions of the main surface of the substrate may be implemented by: causing the main nozzle 50 to travel with respect to the substrate 2 along a locus similar to the locus of the auxiliary nozzle 60 as shown in FIG. 7; or by causing each nozzle to travel vertically with respect to the substrate 2 at the lateral side 2b portion and at the lateral side 2c portion, and causing each nozzle to discharge the liquid to the lateral side 2b portion and to the lateral side 2c portion, and thereafter causing each nozzle to travel transversely with respect to the substrate 2 at the upper side 2a portion, and causing each nozzle to discharge liquid at the upper side 2a portion, as shown in FIG. 8. The main coating liquid coated on the base liquid film spreads within a region where the base liquid film is formed. Accordingly, the process shown in FIG. 6 is more preferable, for efficiently producing a film-coated substrate including uncoated regions 4 at the lateral side 2b portion and the lateral side 2c portion.

When each nozzle is close to the lateral side 2b, 2c (each nozzle is located in a range of 0 to 10 mm perpendicularly from the lateral side, for example) while each coating liquid is discharged, it is preferable that the discharging of the liquid from each nozzle is directed toward the inside of the substrate 2, for example, by directing each nozzle toward the inside of the substrate. This makes it easy to prevent the main coating liquid and the auxiliary coating liquid from entering the back side of the coating target surface.

Speed of the relative movement of each nozzle;
an angle of discharge of each coating liquid with respect to the substrate 2; a distance between the substrate 2 and the discharge opening of each nozzle; and a discharge pressure of the coating liquid, are appropriately determined in consideration of viscosity of the discharged liquid; a discharge amount of the liquid discharged from each nozzle; a set angle of the substrate 2; a degree of occurrence of liquid splitting during application of the liquid; optical distortion and film thickness of the formed coating film, etc.

During coating of the coating liquid, it is preferable that the plate-shaped substrate 2 is held such that the lateral sides 2c and 2d of the substrate 2 are perpendicular to a reference line 7 representing a horizontal direction, as shown in FIGS. 1, 6, 7 and 8. This manner of holding makes it easy to prevent the coating liquid from moving from the coated surface to the back side surface. If the plate-shaped substrate 2 is curved, it is preferable that the substrate 2 is held such that the upper parts of the lateral sides 2c and 2d are perpendicular to the reference line 7 representing the horizontal direction, as shown in FIGS. 2 and 3. This manner of holding serves to allow the coating liquid to flow downward smoothly and thereby enhance the efficiency of coating. FIGS. 1, 2, 3, 6, 7 and 8 further show auxiliary reference lines 71 representing a direction perpendicular to the reference line 7 representing the horizontal direction.

<Operation After Application of Coating Liquid to Substrate>

After application of the main coating liquid to the substrate 2, a drying operation and a solidifying operation are performed, wherein the drying operation is to evaporate the solvent of the auxiliary coating liquid and the solvent of the main coating liquid, and wherein the solidifying operation is to change the coating liquid, which is coated on the substrate 2, into the coating film. Before these operations, a leveling operation may be provided to enhance homogeneity of the coating liquid coated on the substrate 2. During the leveling operation, the substrate 2 is maintained for a predetermined time period (for example, about 1 to 20 minutes at room temperature) in a state where the substrate 2 is in horizontal or inclined attitude.

The drying operation may be implemented by maintaining the substrate 2 at room temperature or heating the coating liquid coated on the substrate 2, and may be performed simultaneously with the solidifying operation. With regard to the solidifying operation, heating, UV irradiation, superheated steam supply, etc., are appropriately selected, depending on the kind of the solid content.

3. Configuration of Film-Coated Substrate

Figure 4:
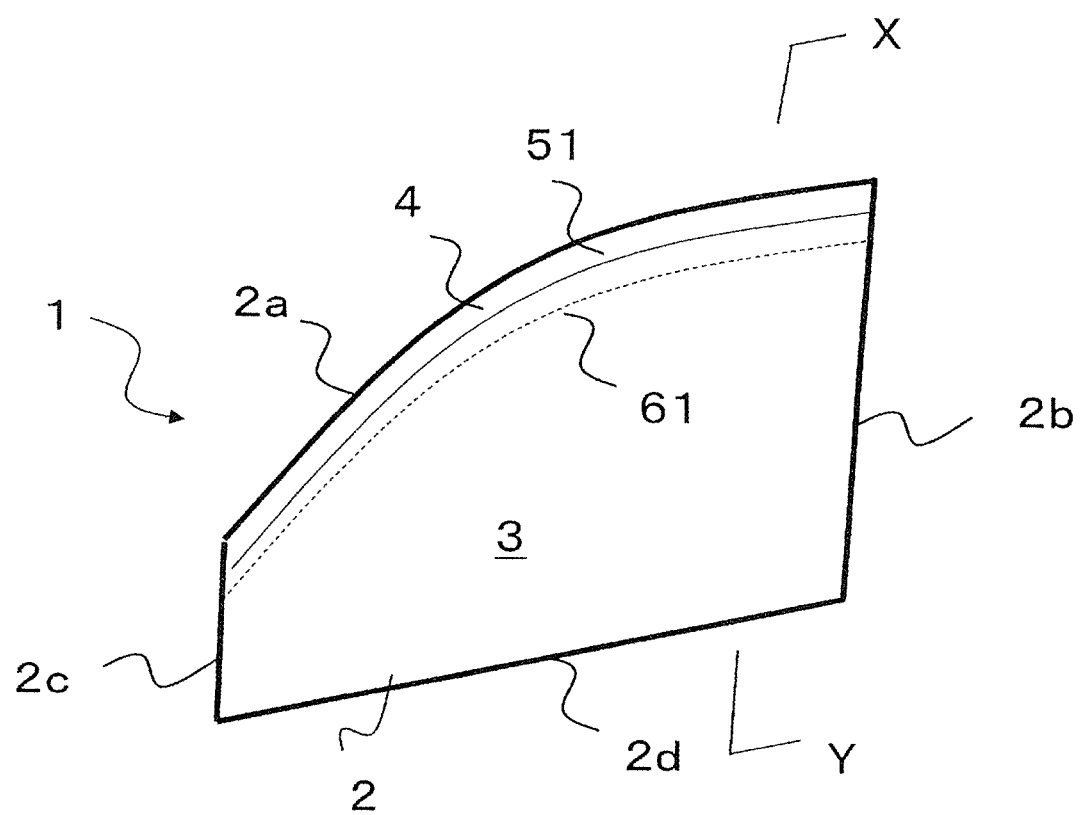
FIG. 4 schematically shows an example of film-coated substrate according to the present invention.
Figure 5:
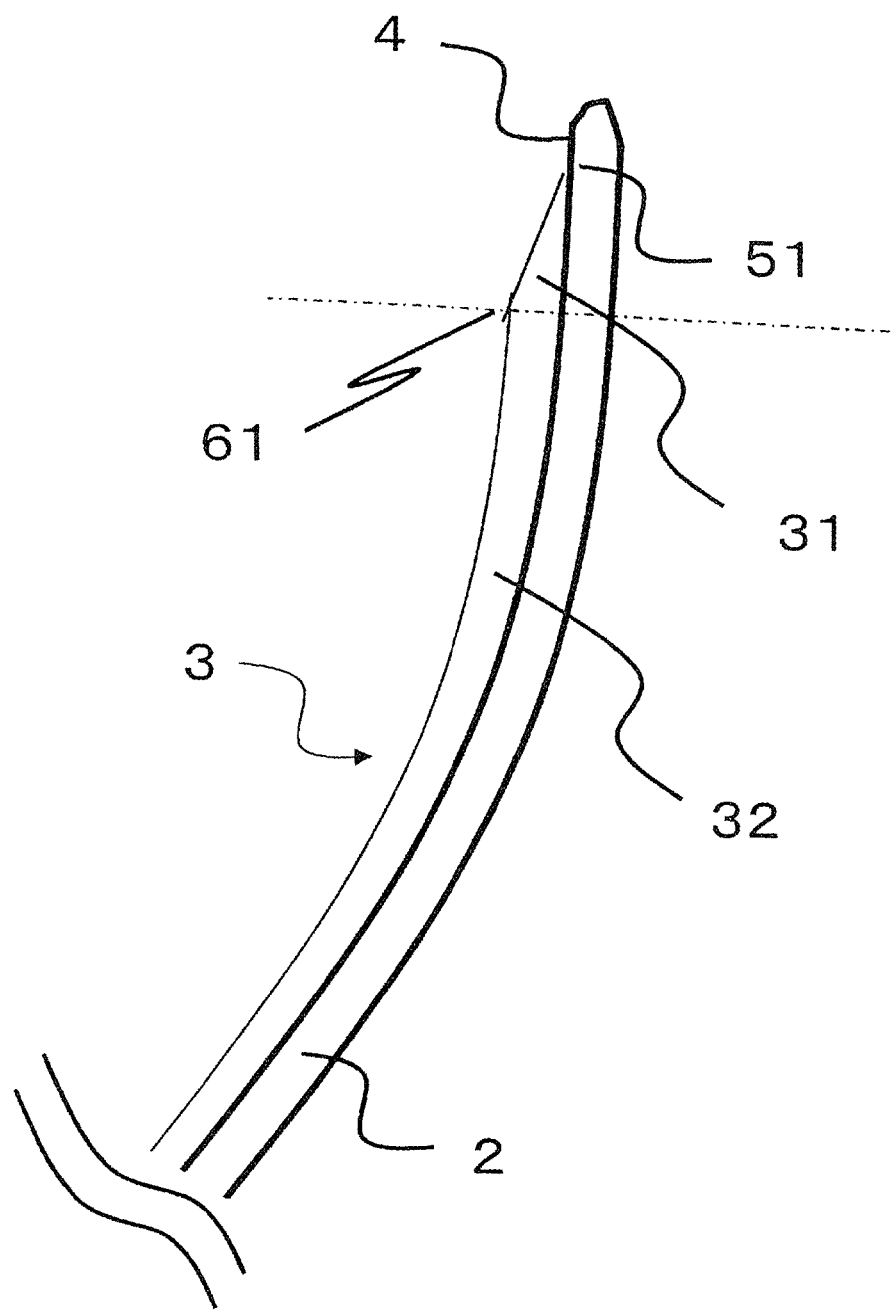
FIG. 5 schematically shows a cross section taken along a line X-Y in FIG. 4.

The process for producing the film-coated substrate according to the present invention makes it easy to form a film-coated substrate which includes an uncoated region, in which no coating film is formed, on the main surface of the substrate. This film-coated substrate can be preferably used as a window glass of a door of an automobile, wherein the window glass is capable of being opened and closed (for example, a window glass set in a side door of an automobile and configured to be slid up and down). Such a door includes a frame for the window glass and a receiving part 8 (run channel) at an upper part of the door for receiving the window glass. It is preferable that a region of the window glass received there is an uncoated region in which no coating film is formed. The following describes the film-coated substrate according to the present invention with reference to the drawings. FIG. 4 schematically shows the film-coated substrate as viewed from the side of the main surface where the coating film is formed. FIG. 5 schematically shows a related part of a cross section of the film-coated substrate 1 taken along a line X-Y.

A part of a coating film 3 having the first film thickness distribution corresponds to a film thickness gradually varying part 31 whose film thickness gradually decreases toward the uncoated region 4 in the periphery of the coating film at the upper side 2a portion. The film thickness gradually varying part 31 extends from a place within a range of 5 to 200 mm vertically from the upper edge side periphery of the coating film, wherein the shorter the distance to the upper edge side periphery is, the more preferable it is. If the distance is less than 5 mm (0 to 5 mm), an angle between the main surface of the substrate and the coating film of the film thickness gradually varying part is larger, which tends to cause an optical distortion of the film thickness gradually varying part, and thereby degrade the appearance of the coating film. It is further preferable that the upper edge side periphery of the coating film is substantially parallel to the place from which the film thickness gradually varying part extends, and the angle between the main surface of the substrate and the coating film of the film thickness gradually varying part is within a range of 0.0005° to 0.02°. The angle between the main surface of the substrate and the coating film of the film thickness gradually varying part can be calculated by measuring film thickness of different portions of the film thickness gradually varying part by a surface roughness measuring device (SURF-CORDER ET4000A manufactured by Kosaka Laboratory Ltd., for example), and using a relationship between film thickness and a distance from the uppermost edge 51 of the film thickness gradually varying part.

The coating film 3 includes a film main part 32 that is other than the film thickness gradually varying part, namely, a part below the lowermost edge 61 of the film thickness gradually varying part (a region below the broken line in FIG. 5). The film main part 32 has preferably a film thickness of 2.5 to 5.5 µm, and more preferably a film thickness of 3.5 to 5.0 µm. If the film thickness is less than 2.5 µm, and the coating film has a function depending on film thickness, it is hard to obtain desired performance. If the film thickness is greater than 5.5 µm, it tends to cause optical distortion and cracking in the coating film 3. The film thickness of the film main part 32 has preferably a standard deviation of 0.5 or less, and more preferably a standard deviation of 0.3 or less. This is because if the standard deviation is greater than 0.5, it tends to cause an optical distortion, and thereby fail to satisfy the optical distortion test and the secondary image separation test according to JIS (Japanese Industrial Standards) R3211 (revised in 1998).

In the present invention, the starting position of the film thickness gradually varying part, namely, the position of the lowermost edge 61 of the film thickness gradually varying part can be defined as a position where a tangent to a central part of the film thickness main part 32 crosses a tangent to the film thickness gradually varying part 31 in a graph that is prepared to represent a relationship between film thickness and a distance vertically from a boundary between the film thickness gradually varying part 31 and the uncoated region 4. The standard deviation of film thickness can be calculated by measuring film thickness at ten arbitrary places (which are selected such that each place is not too close to each other) of the film thickness main part 32, and using the formula of standard deviation.

Figure 10:
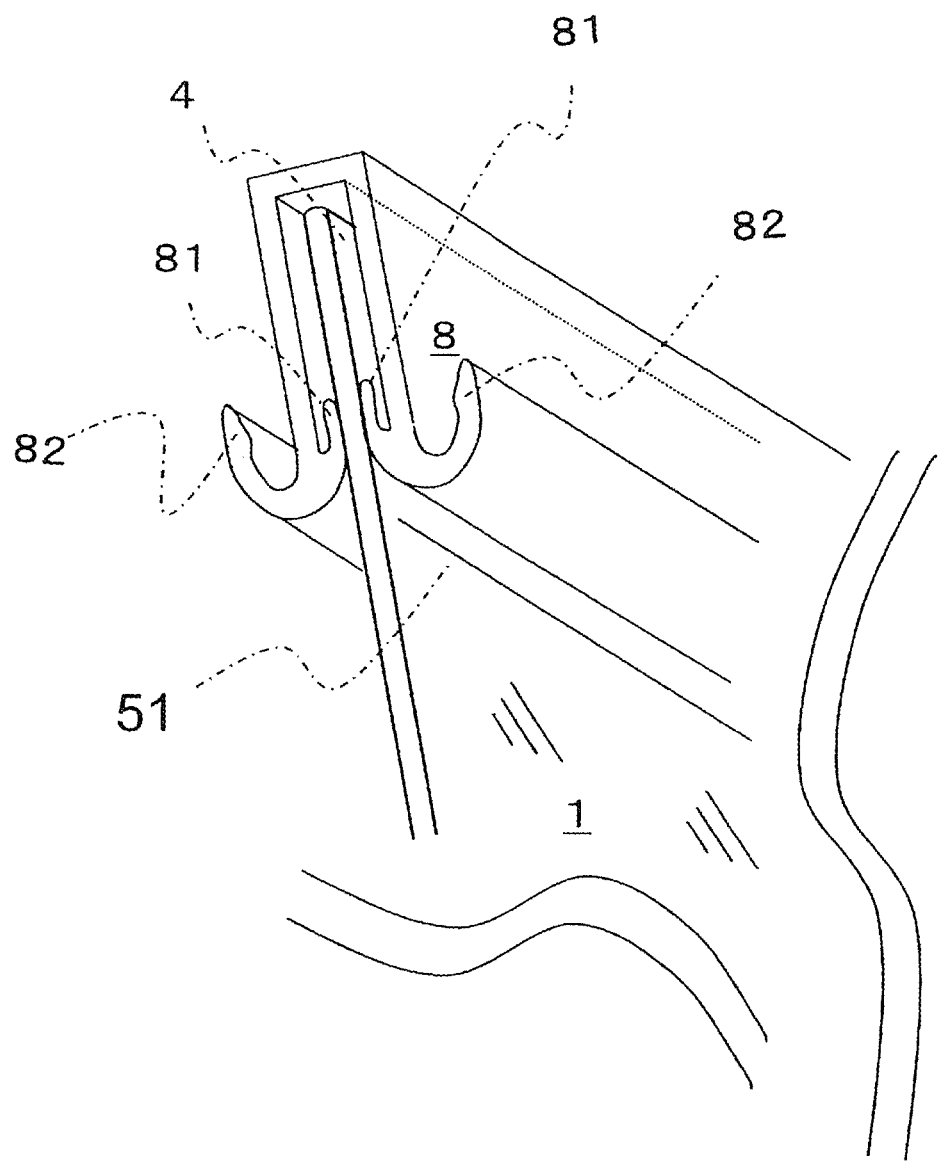
FIG. 10 schematically shows a related part of a structure where the film-coated substrate 1 is received in a receiving part of an upper frame of a door.

If the film-coated substrate 1 is used as a window glass of a door of an automobile which is capable of being opened and closed, the uncoated region 4 is a region that is received in a receiving part (run channel) 8 of an upper frame of the door, as shown in FIG. 10. FIG. 10 schematically shows a related part of a structure where the film-coated substrate 1 is received in the receiving part of the upper frame of the door, wherein the run channel 8 has an U-shaped cross-section. FIG. 10 shows a cross-section of the film-coated substrate 1 taken along a line X-Y in FIG. 4, in the form of an end surface of the film-coated substrate 1.

The run channel 8 includes a pair of seal lips 81 and a pair of outer lips 82 which slidably hold the substrate 1 from both sides in a thickness direction of the substrate 1, wherein the seal lip 81 is in contact with the uncoated region 4. FIG. 10 shows a structure where the film thickness gradually varying part 31 is not received in the run channel 8, but a part of the film thickness gradually varying part 31 may be received in the receiving part of the upper frame of the door. In this case, it is preferable that the part of the film thickness gradually varying part 31 received in the receiving part of the upper frame of the door has a length greater than 0 and less than or equal to 10 mm, and more preferably greater than 0 and less than or equal to 5 mm, from the starting position of the film thickness gradually varying part 31. This configuration makes it possible to provide a larger part having the second film thickness distribution. The film-coated substrate 1 may include another uncoated region in which no coating film is formed, wherein the uncoated region is configured to be received in a receiving part of a lateral frame of the door.

Figure 9:
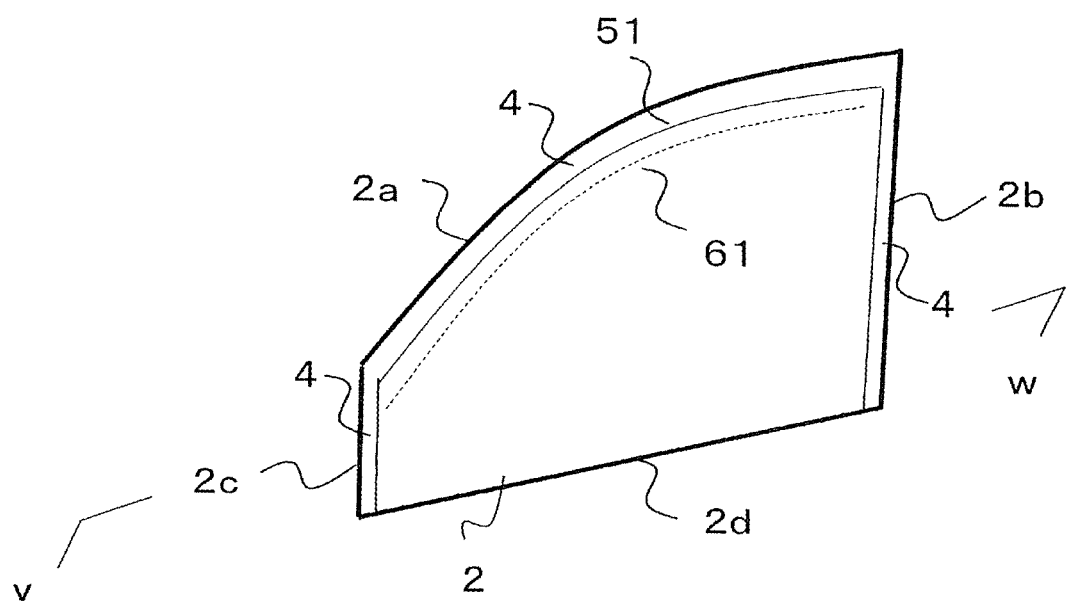
FIG. 9 schematically shows a film-coated substrate 1 that includes uncoated regions 4 at its lateral side portions.
Figure 11:
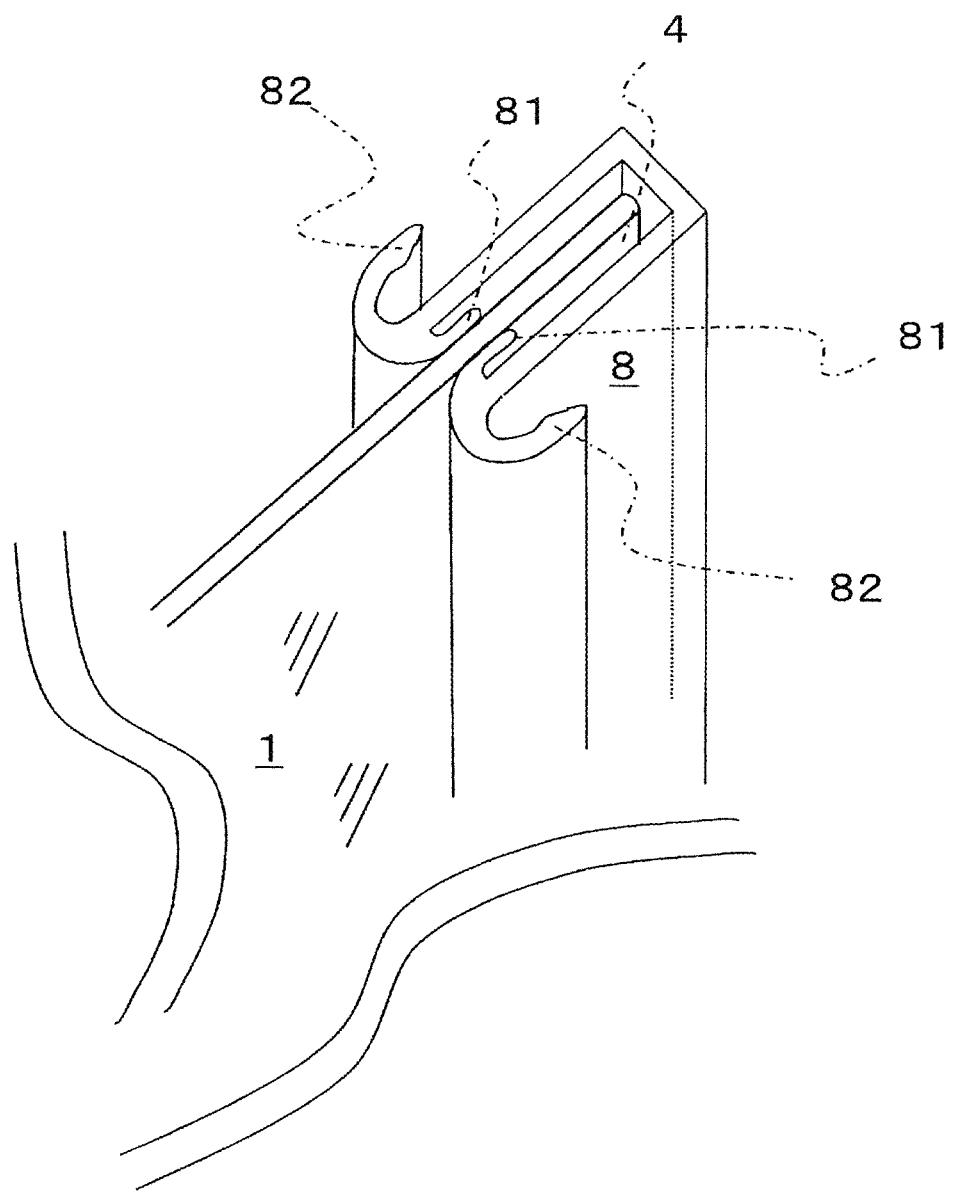
FIG. 11 schematically shows a related part of a structure where the film-coated substrate 1 is received in a receiving part of a lateral frame of the door.

The following further describes an example of the film-coated substrate 1 other than the example shown in FIG. 4, wherein the film-coated substrate 1 includes uncoated regions 4 at the lateral side 2b and 2c portions. FIG. 9 schematically shows a view of the film-coated substrate 1 as viewed from the side of the main surface where the coating film is formed. If the film-coated substrate 1 is used as a window glass of a door of an automobile which is capable of being opened and closed, the uncoated region 4 at the lateral side 2b or 2c portion is received in the receiving part (run channel) 8 of the lateral frame of the door. FIG. 11 schematically shows a related part of a structure where the film-coated substrate 1 is received in the receiving part of the lateral frame of the door. The run channel 8 has a U-shaped cross-section. The run channel 8 includes a pair of seal lips 81 and a pair of outer lips 82 which slidably hold the substrate 1 from both sides in a thickness direction of the substrate 1, wherein the seal lip 81 is in contact with the uncoated region 4. FIG. 11 shows a cross-section of the film-coated substrate 1 taken along a line v-w in FIG. 9, in the form of an end surface of the film-coated substrate 1.

For a model in which a film-coated substrate (glass) is opened and closed by traveling vertically in an automotive door, the skilled person has paid less attention to lateral side portions of the film-coated substrate than an upper side portion of the film-coated substrate. This is because even if a scratch occurs in a part of the film-coated substrate in contact with the seal lip 81, the scratch is not visible from an user of the vehicle, as long as the coating film 3 in the lateral side region has such a hardness that the coating film 3 is not separated from the substrate 2. However, the coating film 3 has a surface inferior in slipperiness to the surface of the substrate. Therefore, for smooth vertical travel of the film-coated substrate 1, it is preferable that the film-coated substrate 1 includes the uncoated regions 4 at the lateral side 2b and 2c portions.

EXAMPLES

The following describes the present invention in detail with reference to examples and comparative examples. However, the present invention is not limited by the following description. The following evaluations <1> and <2> were performed for film-coated substrates obtained in the examples and the comparative examples.

<1> Measurement of Film Thickness and Film Thickness Distribution of Coating Film Film thickness of a coating film of a film-coated substrate was measured by a SURF-CORDER ET4000A manufactured by Kosaka Laboratory Ltd.

<2> Confirmation of Optical Distortion of Film-Coated Substrate

It was confirmed by visual observation whether or not there are external defects such as cracking, distortion, coloration, and cloudiness (an ultraviolet absorbent is not uniformly dispersed in the coating film due to flocculation, etc.) in the coating film of the film-coated substrate.

Example 1

(1) Preparation of Substrate

The substrate 2 was implemented by a curved pane of glass having a thickness of 3.1 mm, a size of 943 mm×512 mm, and a bending rate of 2500 R, which is used as an automotive door glass.

(2) Preparation of Main Coating Liquid

The main coating liquid was implemented by: mixing 2.2 g of TINUVIN 460 (manufactured by BASF) as a triazine-based ultraviolet absorbent, 0.6 g of TINUVIN 477, 0.6 g of TINUVIN 292, 19.4 g of 2-heptanone as a solvent, and 19.4 g of methyl ethyl ketone; stirring the mixture for 30 minutes; mixing the stirred mixture and 0.2 g of a slipping agent (KP109 manufactured by Shin-Etsu Chemical Co., Ltd.), 48.5 g of an epoxy resin composition containing a Si—O—B bond (manufactured by NITTOBO MEDICAL Co., Ltd.) and diluted by 3-methoxy-3-methyl-1-butanol (hereinafter, MMB), and 9.1 g of a tin-doped indium oxide powder (ITO) dispersant (manufactured by Mitsubishi Materials Corporation) diluted by MMB and having 20 wt % of the solid content; stirring the mixture for 30 minutes; and thereby obtaining an ultraviolet/infrared absorbing coating liquid.

(3) Preparation of Auxiliary Coating Liquid

The auxiliary coating liquid was implemented by 2-heptanone, which was the same as the solvent of the main coating liquid. This auxiliary coating liquid was nonvolatile until the main coating liquid was coated, and was capable of being coated without liquid splitting.

(4) Application of Auxiliary Coating Liquid and Main Coating Liquid to Substrate Application of the auxiliary coating liquid to the substrate was implemented by: polishing, cleaning, and drying the substrate; thereafter holding the substrate 2 in raised and leaned attitude such that the lateral sides 2c and 2d of the substrate 2 were perpendicular to the reference line 7 representing the horizontal direction as shown in FIG. 1, and the upper parts of the lateral sides 2c and 2d of the substrate 2 were perpendicular to the reference line 7 representing the horizontal direction as shown in FIGS. 2 and 3; causing the auxiliary nozzle 60 to relatively travel at a speed of 100 mm/sec, along a trajectory substantially parallel to the shape of the upper side 2a of the substrate and 15 mm below the upper side 2a; and discharging the auxiliary coating liquid at a flow rate of 5 g/sec from the auxiliary nozzle 60 having a discharge opening of 2 mmφ.

Application of the main coating liquid to the substrate was implemented by: causing the main nozzle 50 to relatively travel at a speed of 100 mm/sec, along a trajectory substantially parallel to the shape of the upper side 2a of the substrate and 10 mm below from the upper side 2a, and discharging the main coating liquid at a flow rate of 2 g/sec from the main nozzle 50 having a discharge opening of 2 mmφ, when the auxiliary coating liquid is held on the substrate 2.

(5) Leveling Operation, Drying Operation, and Solidifying Operation for Applied Coating Liquid After the coating operation, the substrate was held in raised and leaned attitude such that the lateral side of the lower side portion was vertical, and was subjected to leveling for 20 minutes, and thereafter preliminarily heated for 5 minutes to bring the surface temperature of the substrate up to 180° C. After the preliminarily heating operation, the coating film was solidified by exposing the substrate to superheated steam at 180° C. for 10 minutes, thereby forming a coating film, and obtaining a film-coated substrate.

The obtained film-coated substrate was formed with the uncoated region 4 at the upper side 2a portion, having a smoothly curved parting shape (corresponding to the uppermost edge 51 of the film thickness gradually varying part) serving for favorable appearance. The film thickness gradually varying part was formed between the place where the main nozzle 50 was caused to travel relatively and the place where the auxiliary nozzle 60 was caused to travel relatively, wherein the angle between the main surface of the substrate 2 and the coating film of the film thickness gradually varying part was 0.001°. Film thickness of the other coating film-formed region was 3.5 to 4.5 µm and relatively flat, and had a standard deviation of 0.19. The film-coated substrate had favorable appearance, wherein it was hard to find cracking, distortion, coloration, or cloudiness by visual inspection.

Comparative Example 1

A film-coated substrate was obtained by the same operations as Example 1, except that the auxiliary coating liquid was not used and coating of the liquid was not performed by the auxiliary nozzle. The obtained film-coated substrate includes a coating film whose film thickness gradually increases toward the lower side 2d.

Comparative Example 2

The same operations as Example 1 were performed except that the auxiliary coating liquid was implemented by isopropanol (SP value: 11.5 $(cal/cm^3)^{1/2}$) and acetone (SP value: 10.0 $(cal/cm^3)^{1/2}$), which did not dilute the solvent of the main coating liquid. In this comparative example, the difference in solubility parameter (SP value) between the auxiliary coating liquid and the solvent of the main coating liquid was greater than 1.5 $(cal/cm^3)^{1/2}$.

In this comparative example, miscibility between the main coating liquid and the auxiliary coating liquid was poor, causing liquid splitting of the main coating liquid and thereby failing to form a uniform film. The film was formed with cracking, optical distortion, and cloudiness.

DESCRIPTION OF REFERENCE SIGNS

1: Film-Coated Substrate
2: Substrate
3: Coating Film
31: Film Thickness Gradually Varying Part
32: Film Main Part
4: Uncoated Region
50: Main Nozzle
51: Uppermost Edge of Film Thickness Gradually Varying Part
52: Main Coating Liquid
60: Auxiliary Nozzle
61: Lowermost Edge of Film Thickness Gradually Varying Part
62: Auxiliary Coating Liquid
7: Reference Line Representing Horizontal Direction

The invention claimed is:
1. A door for an automobile, comprising:
an upper frame receiving part as a receiving part of an upper frame;
a lateral frame receiving part as a receiving part of a lateral frame, wherein the lateral frame is adjacent to and substantially perpendicular to the upper frame; and
a window glass implemented by a film-coated substrate, and configured to be opened and closed by vertical slide, wherein the film-coated substrate includes a substrate and a coating film;
wherein the substrate includes an uncoated region where no coating film is formed, wherein the uncoated region is configured to be received in the upper frame receiving part;
wherein the coating film includes a film thickness gradually varying part, wherein the film thickness gradually varying part has a film thickness that decreases gradually toward the uncoated region, wherein the film thickness gradually varying part extends from a line within a predetermined range vertically from an upper edge side periphery of the coating film, wherein the line is substantially parallel to the upper edge side periphery of the coating film;
wherein the film-coated substrate is produced by a film-coated substrate production process including:
an operation of discharging a coating liquid from a main nozzle onto at least the main surface of the substrate as a target of coating, while holding the substrate in raised attitude and causing the main nozzle to travel at an upper side portion of the main surface of the substrate transversely with respect to the substrate, wherein the main nozzle is configured to discharge the coating liquid for formation of the coating film; and
an operation of discharging a solvent from an auxiliary nozzle onto the main surface of the substrate while causing the auxiliary nozzle to travel transversely with respect to the substrate, before discharging the coating liquid as a main coating liquid onto the main surface of the substrate, wherein the auxiliary nozzle is configured to discharge the solvent as an auxiliary coating liquid for dilution of the main coating liquid;
wherein the operation of discharging the main coating liquid from the main nozzle onto the main surface of the substrate is performed when the auxiliary coating liquid is held in liquid film form on the main surface;
wherein the operation of discharging the main coating liquid from the main nozzle includes discharging the main coating liquid to a first region of the main surface outside a second region of the main surface coated with the auxiliary coating liquid, wherein the first region is closer to an upper side of the substrate than the second region, and wherein the second region extends from a first lateral side portion of the substrate to a second lateral side portion of the substrate; and
the film-coated substrate production process includes forming an uncoated region, in which no coating film is formed, in each of the upper side portion and lateral side portions of the substrate, by:

an operation of discharging the auxiliary coating liquid onto the main surface of the substrate, while causing the auxiliary nozzle to travel with respect to the substrate along the upper side and lateral sides of the substrate and with a spacing from each of the upper side and lateral sides; and an operation of discharging the main coating liquid onto the main surface of the substrate, while causing the main nozzle to travel with respect to the substrate along the upper side of the substrate and with a spacing from the upper side.

2. The door as claimed in claim 1, wherein the predetermined range is a range of 5 to 200 mm.

3. The door as claimed in claim 1, wherein an upper surface of the film thickness gradually varying part of the coating film has an angle of 0.0005° to 0.02° with respect to a main surface of the substrate.

4. The door as claimed in claim 1, wherein the substrate is a curved plate.

5. The door as claimed in claim 1, wherein:
the coating film has a film thickness of 2.5 to 5.5 μm except for the film thickness gradually varying part; and
the film thickness of the coating film except for the film thickness gradually varying part has a standard deviation less than or equal to 0.5.

6. The door as claimed in claim 1, wherein a difference in solubility parameter (SP value) between the auxiliary coating liquid and a solvent of the main coating liquid is less than 1.5 $(cal/cm^3)^{1/2}$.

7. The door as claimed in claim 1, wherein the solvent of the main coating liquid is identical in kind to the auxiliary coating liquid.

8. The door as claimed in claim 1, wherein causing each of the main nozzle and the auxiliary nozzle to travel with respect to the substrate is implemented by causing the each of the main nozzle and the auxiliary nozzle to travel with respect to the substrate along a side of the substrate facing the each of the main nozzle and the auxiliary nozzle and with a spacing from the side, so as to form an uncoated region, in which no coating film is formed, in at least one side portion of the substrate.

9. The door as claimed in claim 1, wherein the substrate as the target of coating is curved to have an inwardly curved surface, and wherein the film-coated substrate production process includes discharging the main coating liquid and the auxiliary coating liquid onto the inwardly curved surface of the substrate for formation of the coating film.

10. The door as claimed in claim 1, wherein:
the upper frame receiving part includes a pair of seal lips and a pair of outer lips which slidably hold the substrate from both sides in a thickness direction of the substrate; and
one of the seal lips is in contact with the uncoated region.

11. A door for an automobile, comprising:
an upper frame receiving part as a receiving part of an upper frame;
a lateral frame receiving part as a receiving part of a lateral frame, wherein the lateral frame is adjacent to and substantially perpendicular to the upper frame; and
a window glass implemented by a film-coated substrate, and configured to be opened and closed by vertical slide, wherein the film-coated substrate includes a substrate and a coating film;

wherein the substrate includes an uncoated region where no coating film is formed, wherein the uncoated region is configured to be received in the upper frame receiving part;

wherein the coating film includes a film thickness gradually varying part, wherein the film thickness gradually varying part has a film thickness that decreases gradually toward the uncoated region, wherein the film thickness gradually varying part extends from a line within a predetermined range vertically from an upper edge side periphery of the coating film, wherein the line is substantially parallel to the upper edge side periphery of the coating film; and wherein the substrate includes a second uncoated region where no coating film is formed, wherein the second uncoated region is configured to be received in the lateral frame receiving part.

12. The door as claimed in claim 11, wherein:
the lateral frame receiving part includes a pair of seal lips and a pair of outer lips which slidably hold the substrate from both sides in a thickness direction of the substrate; and
one of the seal lips is in contact with the second uncoated region.

13. A door for an automobile, comprising:
an upper frame receiving part as a receiving part of an upper frame; and
a window glass implemented by a film-coated substrate, and configured to be opened and closed by vertical slide, wherein the film-coated substrate includes a substrate and a coating film;

wherein the substrate includes an uncoated region where no coating film is formed, wherein the uncoated region is configured to be received in the upper frame receiving part;

wherein the coating film includes a film thickness gradually varying part at an upper edge side periphery of the coating film, wherein the film thickness gradually varying part has a film thickness that decreases gradually toward the uncoated region, wherein the film thickness gradually varying part extends from a line within a range of 5 to 200 mm vertically from the upper edge side periphery of the coating film, and wherein the line is substantially parallel to the upper edge side periphery of the coating film;

wherein the upper frame receiving part includes a pair of seal lips and a pair of outer lips which slidably hold the substrate from both sides in a thickness direction of the substrate; and wherein one of the seal lips is in contact with the uncoated region;

wherein the door further comprises a lateral frame receiving part as a receiving part of a lateral frame, wherein the lateral frame is adjacent to and substantially perpendicular to the upper frame, wherein the substrate includes a second uncoated region where no coating film is formed, wherein the second uncoated region is configured to be received in the lateral frame receiving part.

14. The door as claimed in claim 13, wherein an upper surface of the film thickness gradually varying part of the coating film has an angle of 0.0005° to 0.02° with respect to a main surface of the substrate.

15. The door as claimed in claim 13, wherein:
the coating film has a film thickness of 2.5 to 5.5 μm except for the film thickness gradually varying part; and the film thickness of the coating film except for the film thickness gradually varying part has a standard deviation less than or equal to 0.5.

16. The door as claimed in claim 13, wherein:

the lateral frame receiving part includes a pair of seal lips and a pair of outer lips which slidably hold the substrate from both sides in the thickness direction of the substrate; and one of the seal lips of the lateral frame receiving part is in contact with the second uncoated region.

\* \* \* \* \*